US011971835B2

United States Patent
Venkatanarayanan et al.

(10) Patent No.: US 11,971,835 B2
(45) Date of Patent: Apr. 30, 2024

(54) TECHNIQUES FOR CREATING CONNECTIONS IN A NETWORK FABRIC

(71) Applicant: Dell Products L.P., Hopkinton, MA (US)

(72) Inventors: Prakash Venkatanarayanan, Bangalore (IN); Matthew Long, Uxbridge, MA (US); Hari Prasad Chandrasekaran, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 239 days.

(21) Appl. No.: 17/482,975

(22) Filed: Sep. 23, 2021

(65) Prior Publication Data
US 2023/0091184 A1 Mar. 23, 2023

(51) Int. Cl.
*G06F 13/40* (2006.01)
*G06F 16/2455* (2019.01)

(52) U.S. Cl.
CPC ...... *G06F 13/4022* (2013.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 11,159,453 B2 * | 10/2021 | McBrearty | .......... | H04L 67/1097 |
| 2014/0052845 A1 * | 2/2014 | Nayak | .................. | G06F 3/0665 709/224 |
| 2016/0050277 A1 * | 2/2016 | Kirk | ........................ | H04L 45/72 370/392 |
| 2020/0293210 A1 * | 9/2020 | McBrearty | .............. | G06F 3/067 |
| 2022/0129152 A1 * | 4/2022 | Adams | .................... | G06F 3/061 |

OTHER PUBLICATIONS

Atish Patel, "Device Login Process FLOGI, PLOGI, PRLI SAN Switch Tutorial—4," https://storage-admin.com/what-is-flogi-plogi-and-prli-in-san-switch/, Date Jan. 15, 2020.

* cited by examiner

*Primary Examiner* — Farley Abad
*Assistant Examiner* — Dayton Lewis-Taylor
(74) *Attorney, Agent, or Firm* — Muirhead and Saturnelli, LLC

(57) ABSTRACT

Techniques for creating and establishing a configuration of connections between an initiator system and a target system can use whitelisted target ports, wherein the configuration only includes connections to selected whitelisted target ports. Automatic login of each initiator to all zoned and discovered target ports can be avoided where, alternatively, an on-demand or needs-based login can be performed by having each initiator only log into its whitelisted target ports. In this manner, better resource usage and scalability can be obtained using the techniques of the present disclosure. In one embodiment, the whitelisted target ports can be determined automatically using an intersection of target port lists obtained using a control path connection and using a fabric nameserver query. The configuration including the whitelisted targets can be persistently stored on the initiator system to enable restoration of the whitelisted targets across reboots and resets of the initiator system.

17 Claims, 9 Drawing Sheets

TECHNIQUES FOR CREATING CONNECTIONS IN A NETWORK FABRIC

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein may include a computer-implemented method, a system and a non-transitory computer readable medium comprising: receiving a plurality of lists of target ports for a plurality of initiator ports, wherein each of the plurality of lists is associated with a corresponding one of the plurality of initiator ports and specifies one or more target ports for said corresponding initiator port, wherein an initiator system of a network fabric includes the plurality of initiator ports and wherein a target system of the network fabric includes a plurality of target ports; determining a configuration of a plurality of connections, wherein each of the plurality of connections is between one of the plurality of initiator ports and a target port included in a corresponding one of the plurality of lists associated with said one initiator port, and wherein the plurality of connections only includes connections to target ports included in the plurality of lists of target ports; and establishing the plurality of connections.

In at least one embodiment, processing can include: zoning a switch of the network fabric to define a zone including the plurality of initiator ports, the plurality of target ports, and a plurality of zoned connections between the plurality of initiator ports and the plurality of target ports; subsequent to said zoning, performing first processing, wherein said first processing includes each of the plurality of initiator ports logging into the switch, each of the plurality of initiator ports registering with a name service of the fabric, and each of the plurality of target ports logging into the switch, and each of the plurality of target ports registering with the name service; and subsequent to said first processing, performing second processing, wherein said second processing includes each of the plurality of initiator ports discovering using the name service which of the plurality of target ports are visible over the switch to said each initiator port.

In at least one embodiment, establishing the plurality of connections can further comprise each of the plurality of initiator ports logging into each of the plurality of target ports that is visible to said each initiator port and included in a corresponding one of the plurality of lists associated with said each initiator port. Each of the plurality of target ports that is visible to said each initiator port can mean that said each target port is logged into the switch, that said each initiator port is logged into the switch, that said each initiator port and said each target port are included in the zone, that said each initiator port is registered with the name service, and that said each target port is registered with the name service. The zone can include a first target port that is not included in the plurality of target ports and also not included on any of the plurality of lists of target ports. The plurality of connections cannot include any connection to the first target port.

In at least one embodiment, processing can include creating the plurality of lists of target ports. Creating the plurality of lists of target ports can further comprise: determining a first list of target ports of the target system, wherein the first list identifies all target ports of the target system, wherein each target port of the first list is a candidate target port for use with each of the plurality of initiator ports; determining a second list of target ports of the target system, wherein the second list includes, for each of the plurality of initiator ports, each of the plurality of target ports which is zoned and visible to said each initiator port; and determining the plurality of lists of target ports in accordance with an overlap or intersection between the first list and the second list. The first list of target ports can be determined using an established control path connection between the initiator system and the target system. The initiator system can be an initiator data storage system, and the target system can be a target data storage system which is different than the initiator data storage system. Determining the first list of target ports can further include querying, over the established control path connection, a database of the target data storage system for the first list of target ports of the target data storage system, wherein the database is a data storage system configuration database that describes physical entities and logical entities in a current configuration of the target data storage system. Determining the second list of target ports can include querying the name service of the network fabric to determine, for each of the plurality of initiator ports, which of the plurality of target ports are visible to said each initiator port.

In at least one embodiment, processing can include modifying one of the plurality of lists of target ports, wherein the one list specifies target ports to which a first initiator port of the plurality of initiator ports is allowed to log into over the switch. Modifying can include adding a new target port to said one list. Responsive to said adding the new target port, processing can further include: logging the new target into the switch; registering the new target with the name service; discovering, by the first initiator port using the name service, that the new target port is visible to said first initiator port; and logging the first initiator port into said new target port. Modifying can include deleting an existing target port from said one list. Responsive to deleting the existing target port from the one list, the processing can include logging said first initiator port out of said existing target port. Responsive to deleting the existing target port from the one list, processing can include resetting and restarting the first initiator port. Responsive to resetting and restarting the first initiator port, processing can be performed that includes: logging the first initiator port into the switch; registering the first initiator port with the name service; discovering, using the name service, which of the plurality of target ports are visible to the first initiator port; and establishing connections between the first initiator port and each target port of the plurality of target ports which is included in said one list and also determined as visible to said initiator port as a result of said discovering using the name service, which of the plurality of target ports are visible to the first initiator port.

BRIEF DESCRIPTION OF THE DRAWINGS

Features and advantages of the present disclosure will become more apparent from the following detailed description of exemplary embodiments thereof taken in conjunction with the accompanying drawings in which.

Figure 1:
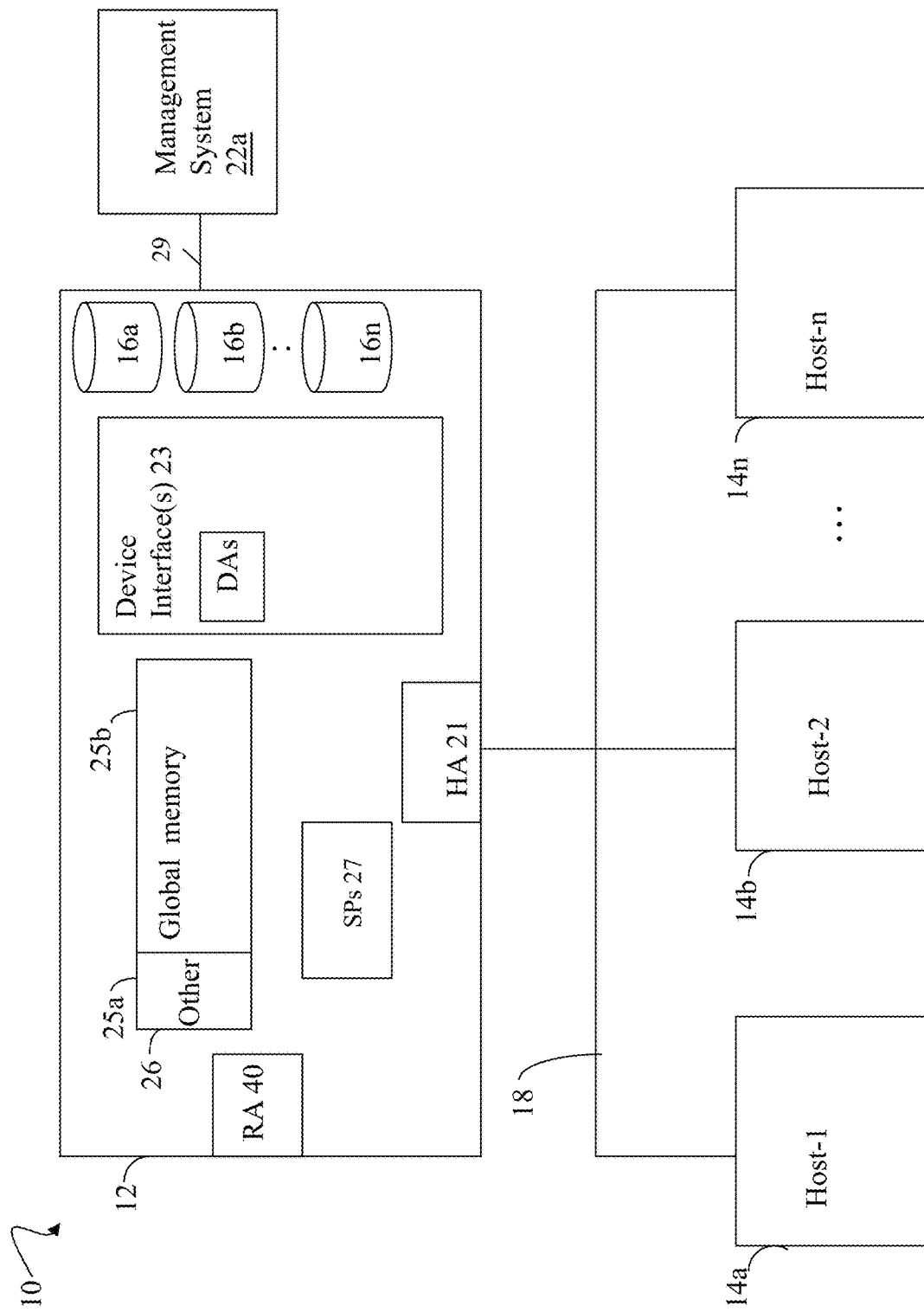
FIG. 1 is an example of components included in a system in accordance with the techniques of the present disclosure.

DETAILED DESCRIPTION OF
EMBODIMENT(S)

In a Storage Area Network (SAN), such as a Fibre Channel (FC)-based SAN, zoning is performed to specify connectivity between an initiator, such as a host, and a target, such as a data storage system. Zoning can be performed with respect to a switch, or more generally, a network fabric or switching fabric. Zoning allows a SAN administrator to control which initiators of the host can see what target ports of the data storage system. Zones can be created by grouping host interfaces (e.g., host initiator ports) and data storage system interfaces (e.g., target ports) into zones. The set of zones created can be placed into a zone set or zoning configuration which is then activated on the fabric, such as the switching fabric, to define the allowable connections between host initiators and target ports of the data storage system. For example, a host initiator can be a host initiator port which is zoned to one or more target ports of the data storage system. Once such zones are created and activated, the ports of the switching fabric can perform discovery processing and login to the switch. Additionally based on an existing zone, each initiator port typically logs into all possible targets. For example, a host initiator can be a host initiator port which is zoned to multiple target ports of the data storage system. Once such zones are created and activated, typically all zoned initiators login to all zoned, discovered targets as part of SAN initialization. For example, for a zone of N initiators and M targets, each of the N initiators logs into each of the M targets.

In at least one embodiment in accordance with the techniques of the present disclosure, an initiator system including the initiator ports can be a first data storage system, such as a data storage appliance or array, and a target system including the target ports can be a second data storage system, such as another data storage appliance or array. In such an FC-based SAN environment in which a data storage system can function as both an initiator and a target, the data storage system can have an FC driver that functions in a dual mode or role acting as both an initiator and a target. When the data storage system rather than the host functions as an initiator system, processing as noted above is also typically performed automatically where all zoned initiators login to all zoned, discovered targets as part of SAN initialization. While SAN initialization can be facilitated by automatically having all zoned initiators of the initiator data storage system automatically login to all zoned, discovered targets, such automated login by the initiators to all zoned, discovered targets also has drawbacks and can create problems. For example, having all initiators login to all zoned, discovered targets presents problems in terms of scaling and performance due to the large number of zoned initiators and discovered targets. Additionally, when a first data storage system functions as the initiator system, many of the zoned connections between the initiator ports of the first data storage system and targets ports of a second data storage system may not actually be used or needed.

Accordingly, described in the present disclosure are techniques that can be used to create or establish need-based connections between initiators and targets in an FC-based network fabric, such as a SAN. In at least one embodiment, the automatic login where each zoned initiator logs into every zoned, discovered target is omitted or avoided. Alternatively, in such an embodiment, such initiator logins to target ports are performed on a more limited or restricted basis to only specified defined target ports. In at least one embodiment, the particular connections established as a result of initiator-target port logins can be selective based on user-specified selections. In this manner, a user such as a storage administrator can specify a more limited set of initiator-target port connections to be established or created during SAN initialization. Additionally, in at least one embodiment, the user-specified selections can be stored persistently and reused, for example, during SAN re-boots and/or re-initializations, so that only the selected specified set of initiator-target port connections are established or created. In at least one embodiment, the techniques of the present disclosure establishing only the user-specified initiator-target port connections can be used with processing performed when the data storage system functions as the initiator or as the initiator system. Thus, the techniques herein can be used to limit or restrict the particular target ports which an initiator port of the initiator data storage system logs into. In this manner, the techniques of the present disclosure provide for more efficient usage of resources of the SAN and the data storage systems.

In the following paragraphs, the techniques of the present disclosure are illustrated with reference to particular protocols or standards such as, for example, SCSI and FC. More generally, the techniques herein can be used with any suitable protocol and standard. For example, the techniques herein can also be used with NVMe over FC.

The foregoing and other aspects of the techniques of the present disclosure are described in more detail in the following paragraphs.

Referring to the FIG. 1, shown is an example of an embodiment of a SAN10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
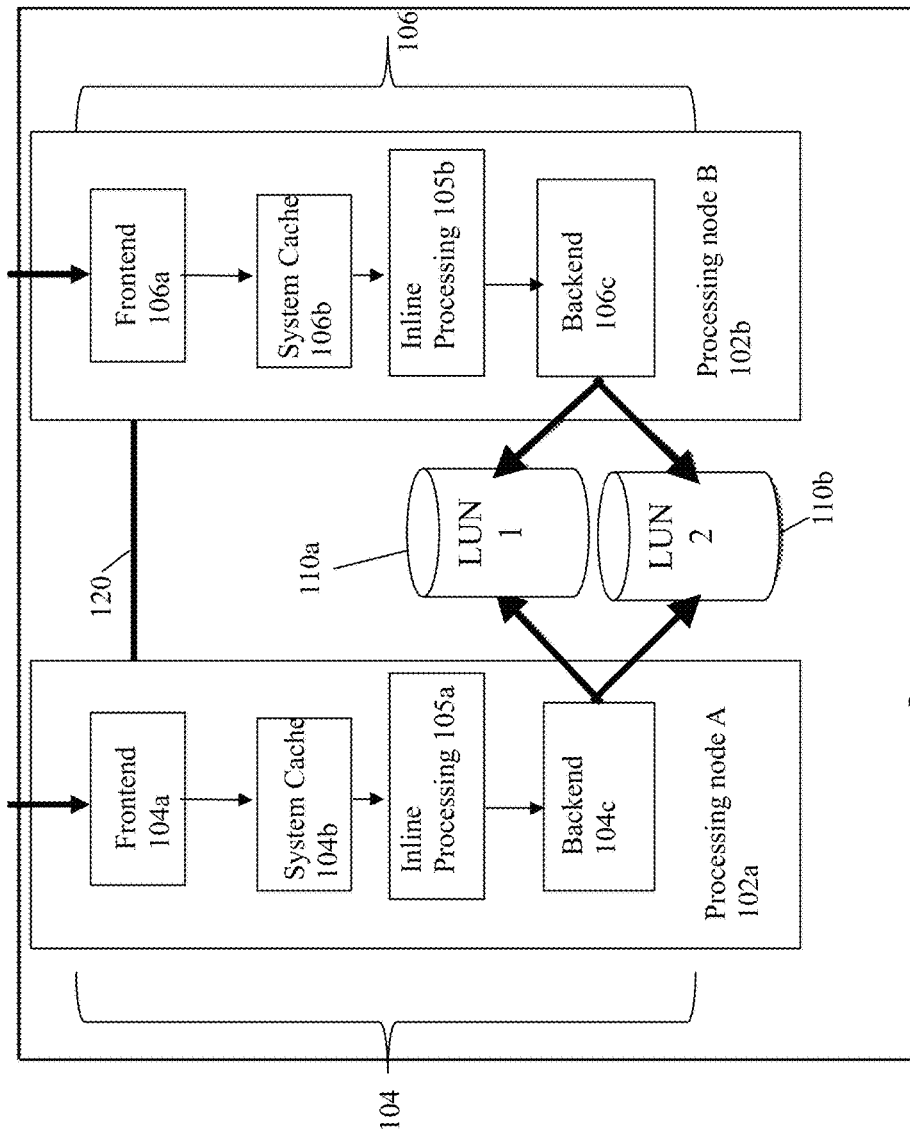
FIG. 2 is an example illustrating the P0 path or data path in connection with processing data in an embodiment in accordance with the techniques of the present disclosure.

With reference to the FIG. 2, shown is an example 100 illustrating components included in the data path in at least one existing data storage system in accordance with the techniques herein. The example 100 includes two processing nodes A 102a and B 102b and the associated software stacks 104, 106 of the data path, where I/O requests are received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing is performed by layer 105a. Such inline processing operations of 105a is optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing includes, for example, performing one or more data reduction operations such as data deduplication or data compression. The inline processing includes performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is directed to a location or logical address of a LUN and where data is read from, or written to, the logical address. The LUNs 110a, 110b are examples of storage objects representing logical storage entities included in an existing data storage system configuration. Since, in this example, writes, or more generally I/Os, directed to the LUNs 110a, 110b are received for processing by either of the nodes 102a and 102b, the example 100 illustrates what is also be referred to as an active-active configuration.

In connection with a write operation received from a host and processed by the processing node A 102a, the write data is written to the system cache 104b, marked as write pending (WP) denoting it needs to be written to the physical storage 110a, 110b and, at a later point in time, the write data is destaged or flushed from the system cache to the physical storage 110a, 110b by the BE component 104c. The write request is considered complete once the write data has been stored in the system cache whereby an acknowledgement regarding the completion is returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be optionally performed. For example, the inline processing can include performing data compression processing, data deduplication processing, and the like, that convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 is used for internode communication between the nodes 102a, 102b.

In connection with at least one embodiment in accordance with the techniques herein, each processor or CPU includes its own private dedicated CPU cache (also sometimes referred to as processor cache) that is not shared with other processors. In at least one embodiment, the CPU cache, as in general with cache memory, is a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache in at least one embodiment is substantially faster than the system RAM used as main memory, where the processor cache contains information that the processor will be immediately and repeatedly accessing. The faster memory of the CPU cache, for example, runs at a refresh rate that's closer to the CPU's clock speed, which minimizes wasted cycles. In at least one embodiment, there are two or more levels (e.g., L1, L2 and L3) of cache. The CPU or processor cache includes at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor is the closest of all cache levels (e.g., L1-L3) to the processor which stores copies of the data from frequently used main memory locations. Thus, the system cache as described herein includes the CPU cache (e.g., the L1 level cache or dedicated private CPU/processor cache) as well as other cache levels (e.g., the LLC) as described herein. Portions of the LLC are used, for example, to initially cache write data which is then flushed to the backend physical storage such as BE PDs providing non-volatile storage. For example, in at least one embodiment, a RAM based memory is one of the caching layers used as to cache the write data that is then flushed to the backend physical storage. When the processor performs processing, such as in connection with the inline processing 105a, 105b as noted above, data is loaded from the main memory and/or other lower cache levels into its CPU cache.

In at least one embodiment, the data storage system is configured to include one or more pairs of nodes, where each pair of nodes is generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure includes the minimum single pair of nodes and up to a specified maximum number of PDs. In some embodiments, a single base enclosure can be scaled up to have additional BE non-volatile storage using one or more expansion enclosures, where each expansion enclosure includes a number of additional PDs. Further, in some embodiments, multiple base enclosures are grouped together in a load-balancing cluster to provide up to the maximum number of node pairs. Consistent with other discussion herein, each node includes one or more processors and memory. In at least one embodiment, each node includes two multi-core processors with each processor of the node having a core count of between 8 and 28 cores. In at least one embodiment, the PDs are all non-volatile SSDs, such as flash-based storage devices and storage class memory (SCM) devices. It should be noted that the two nodes configured as a pair are also sometimes be referred to as peer nodes. For example, the node A 102a is the peer node of the node B 102b, and the node B 102b is the peer node of the node A 102a.

In at least one embodiment, the data storage system is configured to provide both block and file storage services with a system software stack that includes an operating system running directly on the processors of the nodes of the system.

In at least one embodiment, the data storage system is configured to provide block-only storage services (e.g., no file storage services). A hypervisor can be installed on each of the nodes to provide a virtualized environment of virtual machines (VMs). In at least one embodiment, the system software stack executes in the virtualized environment deployed on the hypervisor. In at least one embodiment, the system software stack (sometimes referred to as the software stack or stack) includes an operating system running in the context of a VM of the virtualized environment. Additional software components can be included in the system software stack and can also execute in the context of a VM of the virtualized environment.

In at least one embodiment, each pair of nodes is configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not be shared with other pairs of nodes. A host can access data stored on a BE PD through the node pair associated with, or attached to, the PD.

In at least one embodiment, each pair of nodes provides a dual node architecture where both nodes of the pair are generally identical in terms of hardware and software for redundancy and high availability. Consistent with other discussion herein, each node of a pair performs processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair includes its own resources such as its own local (i.e., used only by the node) resources such as local processor(s), local memory, and the like.

Figure 3:
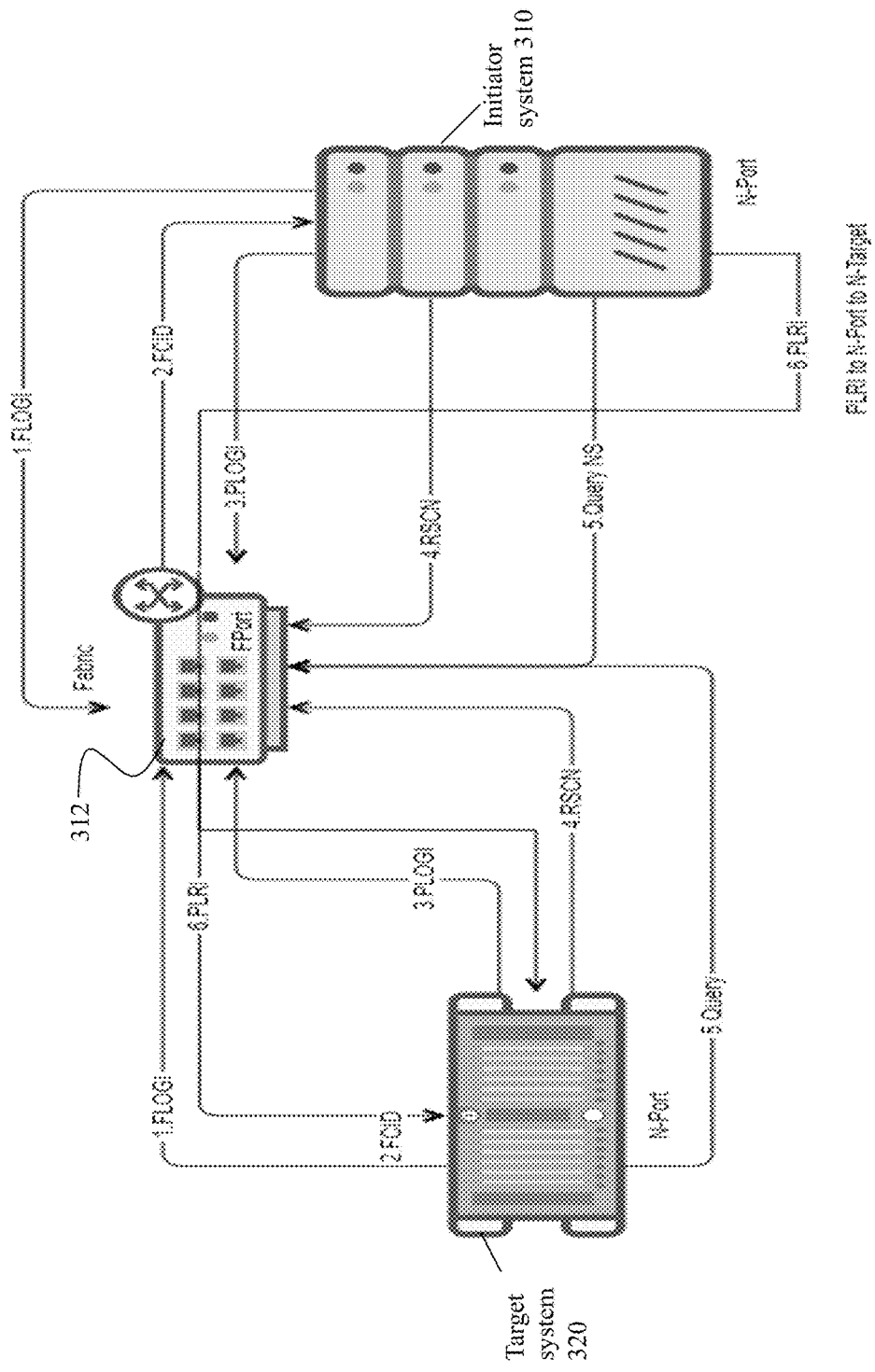
FIG. 3 is an example illustrating processing in a typical SAN initialization.

Referring to FIG. 3, shown is an example 300 illustrating components and a sequence of steps typically performed in a FC SAN initialization. The example 300 illustrates steps that can generally be performed between an initiator system 310 and a target system 320. In a typical SAN, the initiator system 310 can be a host and the target system 320 can be a data storage system. The element 312 denotes a switch, or more generally a SAN fabric, that facilitates communication between the systems 310, 320.

In a first step 1, all FC devices login to the fabric 312. The FC devices include initiator ports, such as the initiator HBA (host bus adapter) ports of the host 310, and target ports, such as the target ports of the data storage system 320. Each of the initiator ports of 310 and each of the target ports of 320 login to the fabric 312 such as using the FLOGI (fabric login) command. When a port logs into the fabric 312 using the FLOGI command, the port sends information about the port to the fabric 312. The information sent by a port with the FLOGI command in the step 1 can include, for example, the WWPN (World Wide Port Name) of the port currently logging into the fabric 312. The WWPN is unique identifier for each FC port of any FC device. A port's WWPN is used to uniquely identify the port in the SAN or network.

In response to receiving the FLOGI command from a port in the first step 1, the fabric 312 returns an FCID (FC Identifier) to the port in the second step 2. The fabric 312 assigns an FCID to the port and the port confirms to the fabric 312 that it received an FCID. The fabric 312 uses this FCID assigned to the port to identify the particular port in the SAN. For example, the fabric 312 uses the FCID of a port to route traffic to the port. Following the second step 2 is a third step 3.

In the third step 3, each of the initiator ports and target ports logs into the FCNS (FC Name Server), sometimes referred to herein as the Name Server, using the PLOGI (port login) command. Generally, the PLOGI process includes port initialization and includes registration with the FCNS of the fabric 312. During the port initialization portion of the PLOGI process, the port and the fabric 312 exchange information such as, for example, the port type and the port speed of the port. The fabric negotiates with the port during the port initialization such as regarding the communication speed of the link between the port and the fabric 312. During the Name Server registration portion of the PLOGI process, the port registers its information with the FCNS such as, for example, regarding the port's capabilities, the port's WWPN, the type of port (e.g., whether the port is an initiator or target), and the like. Each fabric maintains a FCNS. This FCNS includes the information of every port, or more generally every device, connected to the SAN Fabric. Two devices in the SAN can communicate with each other only if both devices are registered with the FCNS. Following the third step 3 is a fourth step 4.

In the step 4, each of the initiator ports and target ports registers with the fabric controller for state change notification. The Registered State Change Notification (RSCN) is an FC service of the fabric 312 that informs registered devices, such as registered initiator ports and target ports, about changes in the fabric. A port registered to receive state change notifications (RSCNs) from the FC service is notified of subsequent state changes or events in the fabric. A state change can include, for example, when a new port or device logs into the fabric, or when a port or device logs out of the fabric. When a state change to the fabric 312 occurs, the fabric 312 sends an RSCN message to its registered devices. After receiving an RSCN, a device can automatically sends a name service query to the FCNS to obtain new information such as related to the event or state change that generated the RSCN. Following the step 4 is a fifth step 5.

In the step 5, each of the initiator ports and target ports queries the FCNS of the fabric 312 about other ports, or more generally devices, that the port can communicate with. The result of the foregoing query can be based on the SAN zoning of the fabric 312 indicating, for example, which target ports are visible to which initiator ports. Thus as a result of step 5, each of the FC initiator ports performs discovery processing and obtains from the FCNS a list of which target ports are visible or exposed to the initiator port. In turn, the initiator port issues the PRLI (Process Login) command or request in the step 6 to connect with each of the discovered visible target ports exposed to the initiator port. The target ports typically accept the PRLI from the initiators to complete the connections. Each of these connections between an initiator or initiator port, I, and a target or target port, T, creates or establishes an I-T (initiator-target) nexus or connection in a typical SCSI environment. For each PRLI request sent from an initiator to a target, if proper SAN zoning and LUN masking exist, then the target accepts the PRLI request and communication between the initiator and target commences. Based on the SAN zoning, the list of targets seen by each initiator can vary. Based on LUN masking, initiators have access to LUNs or volumes exposed over each of these targets. Generally, LUN masking is an access control mechanism used by the data storage system to further specify the particular LUNs exposed over particular I-T nexuses or connections. In this manner, the LUN masking can expose different LUNs to different initiators over the same target port. For example, the LUN A can be exposed and accessed by initiator I1 over target port T1, and the LUN B can be exposed and accessed by a different initiator I2 over the same target port T2. However, based on LUN masking, I1 cannot access the LUN B through T1, and I2 cannot access the LUN A through T1. Thus, LUN masking can be characterized as a control mechanism applied in combination with zoning, where the LUN masking is used by the target system to further restrict or limit the LUNs exposed over particular target ports of the target system to particular initiators.

In some configurations, both the initiator system 310 and the target system 320 can be data storage systems. The initiator ports of the initiator data storage system 310 are able to login to target ports of the targets system 320. In some embodiments, there can be multiple target systems 320 where the initiator ports of the initiator data storage system 310 are able to login to target ports of all the multiple targets systems 320. Each of the one or more target systems 320 can be, for example, a remote data storage system, a backup system or storage appliance, and the like, where such target systems 320 are zoned for use by the initiator data storage system 310. In this case, the initiator data storage system 310 can perform the automated login process as discussed above in connection with FIG. 3, where each initiator port logs in to each of its zoned, discovered target port resulting in unused and unnecessary established I-T nexuses or connections.

Effective zoning could eliminate unnecessary logins and unnecessary I-T connections. However, making such zoning changes to eliminate unnecessary logins and unnecessary I-T connections is rare in practice since the FC fabric and SAN environment can constantly change and grow. Even when there are no user LUNs or volumes exposed over some of the targets, many target data storage systems have a default device, such LUNZ (LUN-Zero), to help in certain host management operations. Based on the number of initiators and the I-T connections or paths, there could be many such unnecessary connections from the initiator storage system to other target systems, consuming resources and affecting overall performance of the systems and network. In some instances, many of these default connections configured as a result of automatically connecting each initiator to each discovered target are unnecessary, for example, if the user has no real purpose for such connections. The number of unnecessary connections may increase as the number of targets and initiators increase. Since it is also typical that FC systems register for RSCNs based on such established connections, the RSCN events need to be processed thereby providing for additional unnecessary consumption of system and fabric resources for the unneeded connections that may be created automatically by default. For example, even without any LUN masking, the LUNZ device from a target system can be visible to another storage system which is behaving like an initiator. An initiator storage system with 2 initiators connected to 4 unique target ports of a remote target system results in 8 I-T connections created or established by default. Assuming there is a LUNZ device on each such I-T connection means that the target system further creates 8 LUNZ devices, one for each of the 8 I-T connections.

Hence, the number of LUNZ devices created will grow linearly based on the network topology and number of such remote systems within a zone. Based on the foregoing, performing automated I-T logins as discussed in connection with FIG. 3 can adversely affect the performance and resource usage of the initiator and target systems as well as the SAN. Furthermore, the adverse effects increase as the number of initiator ports increase, as the number of target ports increase, and as the number of LUNs exposed over the target ports increase.

To overcome the adverse effects of the foregoing, at least one embodiment of the techniques described in the following paragraphs utilizes a two-phase approach and a whitelist. The whitelist is a selected list of specified targets or target ports. In at least one embodiment, the whitelist of targets for a particular initiator port can be a subset of all zoned target ports which are exposed or visible to the particular initiator port. In at least one embodiment, the subset denoting the white listed target ports for the initiator ports can be determined automatically as the overlap or intersection between a first list of targets determined using an out-of-band technique and a second list of target determined using an in-band technique. In at least one embodiment as discussed in more detail in the following paragraphs, the out-of-band technique can include using a control path established between the initiator and target systems, and the in-band technique can include querying the FCNS. More generally, in at least one embodiment the whitelisted target ports can be automatically determined in accordance with a specified policy. An embodiment can have multiple such policies, where the specified policy used to determine the whitelisted target ports can be a particular one of the multiple policies that is currently in effect, enforced or otherwise used in automatically determining the whitelisted target ports of a target system with respect to the initiator ports of an initiator system.

As a variation in another embodiment, a user can select one or more of the zoned target ports of interest, where such selected target ports are included in the whitelist, and while those unselected target ports are omitted from the whitelist. In this latter embodiment the user, for example, can make selections from the first list of target ports (e.g., determined using the out-of-band technique) to identify those target ports which are included in the whitelisted target ports. In this latter embodiment with a degraded fabric, the whitelist can contain a target port which has not logged into the fabric (e.g., the target port has not logged into the fabric using PLOGI), where the target port is unreachable and cannot be discovered using an in-band technique such as by querying the FCNS discussed elsewhere herein. Thus in some embodiments, the whitelisted target ports can be selected from the first list of target ports generally using an alternative technique besides an in-band technique such as querying the FCNS.

Although particular examples are provided herein for generating the whitelisted targets ports, an embodiment in accordance with the techniques of the present disclosure can generally use any suitable technique to select and generate the whitelisted target ports with respect to a particular initiator system and target system.

In at least one embodiment, each initiator port discovers all its exposed zoned target ports which are candidates for further subsequent login with the PRLI command. With reference back to FIG. 3, processing as described above in connection with the steps 1-5 of FIG. 3 can be performed. However, in such an embodiment in accordance with the present disclosure, the initiator port does not automatically login to all such discovered target ports as in the step 6 of FIG. 3 discussed above. Rather, in accordance with the techniques of the present disclosure, the step 6 of FIG. 3 is omitted and the initiator port selectively only logs into the selected one or more target ports of the whitelist, where such target ports logged into by the initiator port are also zoned and discovered by the corresponding initiator port associated with the whitelist.

In at least one embodiment, when a user is interested in connecting to a remote system, the target WWPNs of the target ports of the remote system are obtained from the remote system using in an out-of-band method or technique. The out-of-band method or technique may include, for example using a secure control path connection, where management commands are issued to the target remote system to identify the target ports and their associated WWPNs. The control path connection can generally use any suitable management protocol supported by the remote target system. For example, in at least one embodiment, the control path can use CIM-XML over https. As another example, the control path can use a REST connection over https/TLS (transport layer security). A user can be interested in connecting an initiator to multiple target ports of a remote target system. The whitelist of targets can be constructed out of such desired or specified user selected connections. Additional details on how the whitelist can be constructed in at least one embodiment are given below. More generally, the whitelist can be constructed using any suitable technique. This whitelist can also be stored persistently so that during reboots, only these targets of the whitelist are logged into as part of the FC fabric initialization. Note that the following description sets forth an embodiment describing behavior of a data storage system acting as an initiator and does not change any target-side behavior of the storage system.

In at least one embodiment, both the initiator system and the target system can be the same type of system, such as both the same type of data storage system provided by the same vendor. As a variation, the initiator system and the target system can be characterized as different types of systems such as, for example, both data storage systems but each of a different model and perhaps also each provided by different vendors. More generally, the initiator system and the target system can be any suitable system capable of performing the techniques of the present disclosure.

In at least one embodiment, the two-phase approach of the present disclosure includes a first phase or part where the initiator system performs processing of the steps 1-5 as discussed above in connection with FIG. 3. In this manner, the first phase includes completing the FLOGI and PLOGI requests so that all initiator ports of the initiator system and all target ports of the target system login and register with the SAN fabric. However, in at least one embodiment the step 6 is not performed as part of the first phase. In particular, the initiators of the initiator system do not initiate the automatic typical login sequence using PRLI commands or requests (e.g., the step 6 noted above) to establish connections to all zoned and discovered target ports. The second phase or part of the present disclosure includes processing performed to establish I-T connections to only the whitelisted target ports of the target system.

In at least one embodiment using an FC-based SAN fabric, the whitelist identifies ports using WWPNs uniquely identifying such ports. The white list can identify, for each initiator port, any target port(s) to which the initiator port can establish an I-T connection.

Figure 4:
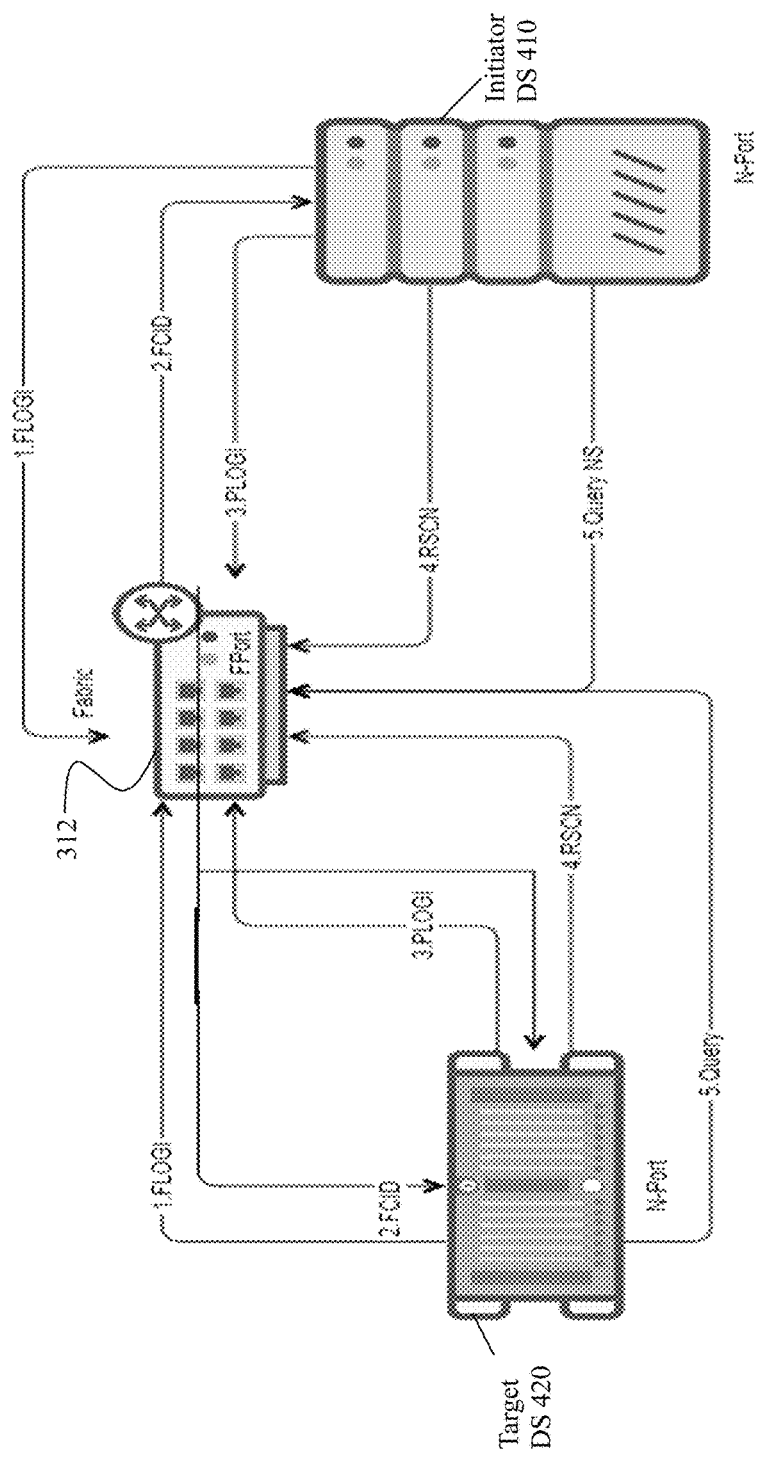
FIG. 4 is an example illustrating processing that can be performed in a first phase in an embodiment in accordance with the techniques of the present disclosure.

Referring to FIG. 4, shown is an example 400 illustrating systems and associated processing steps that may be performed in at least one embodiment in accordance with the techniques of the present disclosure. In particular, FIG. 4 shows processing performed as a result of the first phase of processing in accordance with the techniques of the present disclosure.

The example 400 includes an initiator DS (data storage system) 410, a target DS 420 and a switch 312. More generally the element 312 can denote the SAN or network fabric similar to the element 312 of FIG. 3. The systems 410 and 420 can be data storage systems as described elsewhere herein. In at least one embodiment, the systems 410 and 420 may each be a data storage system including one or more dual node appliances such as illustrated and described in FIG. 2. At least the system 410 is configured with a dual mode FC driver as discussed above so that the system 410 can function as both an initiator and a target. More specifically, the ports of the DS 410 can function as initiator ports and can also function as target ports. In this manner, the system 410 functions as an initiator in connection with the embodiment of FIG. 4, and the system 420 functions as a target with target ports. I-T nexuses or connections can be established between initiator ports of the initiator DS 410 and target ports of the target DS 420.

Consistent with other discussion above, the example 400 illustrates the first phase of processing that includes the steps 1-5 as discussed above in connection with FIG. 4. As a result of completing the first phase of processing, all initiator ports of the system 410 and all target ports of the system 420 have logged into and registered with the SAN fabric 312.

In at least one embodiment in accordance with the techniques herein, the second phase includes selectively establishing connections to only targets included in the whitelist. In at least one embodiment, each initiator port of the system 410 can login using the PRLI command to only those targets of the whitelist. In this manner, only target ports of the whitelist can be considered for PRLI login by initiator ports of the initiator system 410. For the first or initial time, the whitelist can be empty. The empty whitelist can indicate, for example, that the user has not yet established a whitelist for the remote target system 420 where, for example, the initiator ports of the initiator system have not yet performed any PRLI logins to target ports of the remote target system. In one aspect, the techniques of the present disclosure provide for establishing on-demand I-T connections using only those selected targets ports of the whitelist.

In the second phase in at least one embodiment, a control path connection and session can be established between the initiator DS 410 and the desired target DS 420. In at least one embodiment, the second phase can also include creating the whitelist for use with the desired target DS 420 if such a whitelist does not already exist. In at least one embodiment, the user can issue a command or take an explicit action to trigger pairing the initiator DS 410 with the desired target DS 420. For example, in at least one embodiment, a user can issue an explicit command or operation of "Add Remote System" to pair the remote target DS 420 with the initiator DS 410. The adding or pairing of the two systems 410, 420 establishes a control path connection and session between the two systems 410 and 420. Further detail regarding processing that can be performed in the second phase is described in the following paragraphs with reference to FIG. 5. It should be noted that the control path connection could also have been previously established generally at any point in time prior to commencing processing of the step 504.

Figure 5:
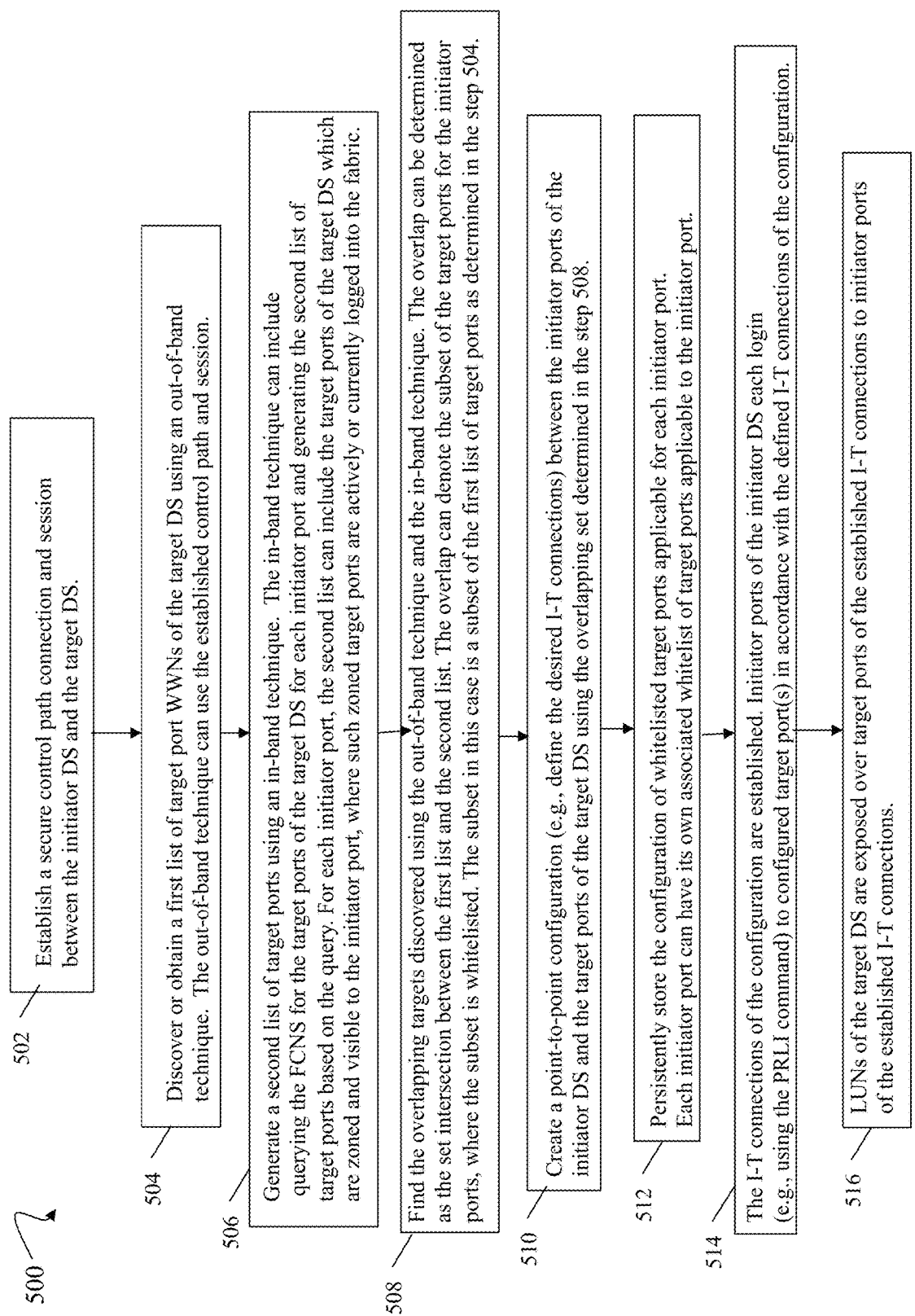
FIGS. 5, 6 and 7 are flowcharts of processing steps that can be performed in an embodiment in accordance with the techniques of the present disclosure.

Referring to FIG. 5, shown is a flowchart 500 of processing steps that can be performed in at least one embodiment in accordance with the techniques herein.

At the step 502, a control path connection and session is established between the initiator DS 410 and the target DS 420. In at least one embodiment, the user is expected to provide the IP address of the control path or management path of the remote target DS 420. The IP address can be used in establishing the control path connection and session between the systems 410 and 420. The step 502 can include the initiator DS 410 establishing a secure communication channel with the remote target DS using the control path IP address provided by the user. Additionally, the user can provide any credentials and authentication information needed to log into the target DS and establish the secure control path connection and session. For example, the secure communication channel can be established using https, TLS (transport layer security), and other suitable protocols using the control-path IP address. From the step 502, control proceeds to the step 504.

At the step 504, the initiator DS 410 obtains or discovers a first list of target ports of the remote target DS using an out-of-band technique or mechanism. The first list can include the unique WWPNs assigned to the target ports of the target DS 420. Generally, the out-of-band technique determines the list of all existing target ports of the target DS using an independent or different mechanism than the active FC SAN fabric. An out-of-band technique or mechanism can be contrasted with an in-band mechanism or technique that discovers target ports of the remote target DS using the FC SAN fabric. For example, an in-band technique can include querying the FCNS of the fabric 312 to determine the target ports of the target DS 420 that are actively connected to the fabric 312 (e.g., are currently logged into the fabric 312 and registered with the FCNS of the fabric 312).

In at least one embodiment, the first list of the step 504 can be obtained using an out-of-band technique that uses the established control path connection and session from the step 502. For example, the step 504 can include the initiator DS issuing one or more control path or management path commands that that query a configuration database of the target DS 402, where configuration database includes a list of all existing target ports of the target DS 402 and also includes the WWPNs of all such existing target ports of the DS 402. As another example, the step 504 can include issuing a management or control path API call to the target DS 420 or issuing a management or control path CLI (command line interface) command to the target DS 420 to obtain the list of all existing target port WWPNs of the target DS 420. As yet another example, the step 504 can include a user providing the list of existing target port WWPNs, for example, by manual input. Generally, the first list generated in the step 504 can include all existing target ports of the target DS 402 independent of whether such target ports are currently logged into, and visible on, the fabric 312. From the step 504, control proceeds to the step 506.

At the step 506, processing is performed by the initiator DS to generate a second list of target ports using an in-band technique. The in-band technique can include querying the FCNS for the target ports of the target DS that are zoned and visible to each initiator port and generating the second list of target ports based on the query. In at least one embodiment, the in-band query technique which queries the FCNS can be optimized to discover targets of a specific remote system by specifying the list of WWPNs of target ports of the single remote system discovered, for example, using the control path (e.g., out-of-band technique) in the step 504 in order to avoid having the query include all targets ports of all devices connected to the fabric. For each initiator port, the second list can include the target ports of the target DS which are zoned and also visible to the initiator port where such target ports are actively or currently logged into the fabric. In this manner, the in-band technique used in the step 506 determines the target ports of the target DS 420 that are both zoned and currently visible to the initiator ports of the initiator DS where such target ports are actively connected to the fabric 312 (e.g., are currently logged into the fabric 312, registered with the FCNS of the fabric 312, and visible on the fabric 312 to the initiator ports). The second list generated in the step 506 can be characterized as those target ports of the target DS that are currently reachable and online in the fabric and also zoned to the initiator ports at the current point in time. In one aspect, the step 506 includes each of the initiator ports discovering, using the fabric, which of the target ports (if any) of the target DS are zoned and visible to the initiator port. In contrast, the first list generated in the step 504 includes all configured target ports of the target DS independent of whether such target ports are online or offline with respect to the fabric. From the step 506, control proceeds to the step 508.

At the step 508, the initiator DS determines the overlap or intersection of the first list of target ports (generated in the step 504 using the out-of-band technique) and the second list of target ports (generated in the step 506 using the in-band technique). The intersection of the foregoing two lists determined can be used in at least one embodiment as the set of target ports which the user intends to pair with the initiator ports of the initiator DS 410. Thus in at least one embodiment, the resulting intersection or overlap of the first list (e.g., determined using the out-of-band technique) and the second list (e.g., determined using the in-band technique) can be used as the whitelist of target ports. In such an embodiment, the overlap denotes the subset of the target ports for the initiator ports, where the subset is whitelisted. The subset in this case is a subset of the first list of target ports as determined in the step 504. To further illustrate, the first list can be T1, T2 and T3 denoting 3 target port WWPNs of the target DS 402 obtained using the established control path. Let I1 and I2 denote the initiator ports of the initiator DS. It can be assumed that target ports of the first list are all candidates for use with each initiator port of the initiator DS. Thus the first list (e.g., determined using the out-of-band technique) can specify the following target ports as candidates for use with each of the initiator ports:

| Initiator Port | Target Ports |
|---|---|
| I1 | T1, T2, T3 |
| I2 | T1, T2, T3 |

Assume further in this example that I1, I2, T1 and T2 are logged into the fabric but T3 is not. In this case, the second list (e.g., determined using the in-band technique) can specify the following target ports as zoned, visible and discovered for each of the initiator ports:

| Initiator Port | Target Ports |
|---|---|
| I1 | T1, T2 |
| I2 | T1, T2 |

In connection with the above example, the step 508 determines that the second list (e.g., determined using the in-band technique) is the overlap or intersection of the foregoing first list (e.g., determined using the out-of-band technique) and second list, where the second list is used to denote the whitelist of target ports for each of the initiator ports. Effectively, the entire whitelist includes a first portion of whitelisted target ports for the initiator port I1 and a second portion of whitelisted target ports for the initiator port I2. Put another way, the first portion of whitelisted targets can denote a first whitelist of target ports for initiator port I1, and the second portion of whitelisted targets can denote a second whitelist of target ports for initiator port I2. Collectively, the first and second whitelists denote the entire whitelist in this example. From the step 508, control proceeds to the step 510.

At the step 510, the initiator DS can perform processing to create or define a point-to-point configuration (e.g., define the desired I-T connections) between the initiator ports of the initiator DS and the whitelisted target ports of the target DS. The target ports used in the step 510 can be those target ports of the whitelists such as determined as the intersection of the first list and the second list in the step 508. For example, consider the above illustration where the step 508 determines that the intersection or overlap of the first list (e.g., determined using the out-of-band technique) and the second list (e.g., determined using the in-band technique) is the following:

| Initiator Port | Target Ports |
|---|---|
| I1 | T1, T2 |
| I2 | T1, T2 |

In this case, the step 510 can define or create a configuration with the following 4 paths or I-T connections: I1-T1; I1-T2; I2-T1 and I2-T2.

The configuration created in the step 510 can be further determined in accordance with a policy. The policy can specify, for example, rules or requirements used when deciding which I-T connections to include in the configuration. Thus as a result of the policy, the particular whitelisted target ports paired with a particular initiator port can be determined in accordance with the policy to meet the particular rules or requirements of the policy. For example, in at least one embodiment, the policy can specify an HA (High-Availability) configuration where each initiator port of the initiator DS connects to at least two target ports of the remote target DS 420 to obtain an HA benefit from any path failure. Put another way, the initiator DS has a list of its initiator ports and now also has a whitelist of target ports for each initiator port as determined in the step 508. The white list from the step 508 can identify, for each zoned and discovered initiator port, one or more particular target port(s), if any, thereby indicating a defined I-T connection between the initiator port and each of the particular target port(s). In the step 510, the initiator DS can now perform processing in accordance with the policy to determine the connections of the configuration, where each connection can be represented as an I-T (initiator port-target port) pair. As a result of the step 510 in at least one embodiment, the particular whitelisted target ports to be paired with one or more of the initiator ports (as determined in the step 508) can be determined in the step 510 to meet the rules or requirements of the policy. The HA policy described above is one example of a policy that can be used in an embodiment in accordance with the techniques herein. An example illustrating an HA configuration and policy is described in more detail, for example, in connection with FIG. 9. More generally, any suitable policy can be used to determine or define the particular I-T connections in the configuration. From the step 510, control proceeds to the step 512.

At the step 512, the initiator DS can perform processing to persistently store the configuration of defined I-T connections by persistently storing the whitelisted target ports for each initiator port. Each initiator port can also have stored in volatile memory its own associated whitelist of target ports applicable to the initiator port. The volatile memory copy can be used, for example, by the FC driver in at least one embodiment. The persistently stored configuration which includes the whitelisted target ports for each initiator port can be used to populate the volatile memory with the whitelist of target ports for each initiator port. The foregoing volatile memory copy of a particular initiator port's whitelist of target ports can be used, for example, by the FC driver in connection with SAN initialization processing. In at least one embodiment, each initiator port can have its own associated whitelist of target ports stored in volatile memory, where the associated initiator port logs into the associated whitelisted targets to establish I-T connections. For example, assume the configuration includes the 4 paths I1-T1; I1-T2; I2-T1 and I2-T2 as noted above. In this case, a first whitelist of target ports T1 and T2 is associated with the initiator port I1 and a second whitelist of target ports T1 and T2 is associated with the initiator port I2.

In at least one embodiment, the configuration of whitelisted targets applicable to each initiator port can be stored persistently by the data path of the initiator DS so that the configuration, and thus whitelisted targets, can be available across reboots. The persistently stored configuration specifies the defined I-T connections of the configuration. The whitelisted targets for all initiator ports as included in the persistently stored configuration can be used to further populate the local volatile memory of each initiator port with the particular whitelist of targets applicable to that particular initiator port. Thus collectively, the whitelists of target ports for all initiator ports specify the defined I-T connections of the configuration. After a subsequent reboot of the SAN fabric, the I-T connections of the configuration can be re-established using the persisted copy of the configuration, where the persisted configuration is used to populate the locally stored whitelists of the initiator ports (e.g., whitelist for each initiator port is stored in volatile memory of the initiator port). In at least one embodiment, the whitelist as stored in the local volatile memory of an initiator port can be used, for example, by an FC driver as discussed elsewhere herein. Thus the persisted configuration including the whitelisted targets ensures that, after a reboot of the SAN fabric, only such whitelisted target ports are used in connection with a subsequent SAN initialization where the same I-T connections of the configuration (as immediately prior to the reboot) can be automatically initiated. It should be noted that generally, the whitelist can include targets or target ports from one or multiple remote target systems.

In at least one embodiment, the data path can persistently store in non-volatile memory (NVM) the whitelist identifying the particular whitelisted target ports for each initiator port. From the data path's NVM whitelist copy, the data path can perform processing to populate volatile memory of each initiator port with that initiator port's associated white list of targets. In this manner, the FC driver of the initiator port can use the volatile memory copy of the initiator port's associated whitelist to log into only those target ports included in the initiator port's whitelist. From the step 512, control proceeds to the step 514.

At the step 514, the I-T connections of the configuration are established. The step 514 can include the initiator ports of the initiator DS each logging in (e.g., using the PRLI command) to configured target port(s) in accordance with the defined I-T connections of the configuration created in the step 510. Put another way, each initiator port issues a PRLI command to log into each of the zoned, discovered target ports included on the whitelist of target ports associated with the initiator port. From the step 514, control proceeds to the step 516.

At the step 516, the LUNs of the target DS are exposed over the target ports of the established I-T connections to the initiator ports of the established I-T connections. In at least one embodiment, the particular LUNs exposed over particular I-T connections can be discovered in the step 516 by the initiator DS issuing different commands over the established I-T connections to the target DS. The particular commands can vary with the protocol used in an embodiment. For example, in an embodiment using SCSI over FC, SCSI commands such as the REPORT LUNS command to discover what LUNs are exposed over particular I-T connections. More generally, any suitable technique can be used to discover the particular LUNs exposed over particular I-T connections.

FIG. 5 illustrates processing that can be performed in at least one embodiment to create a whitelist and also use the created whitelist to establish I-T connections of a configuration in accordance with a policy. In such an embodiment, each of the initiator ports can have its own associated whitelist denoting those whitelisted target ports used for only the single associated initiator port. The whitelist of target ports for a particular initiator port can be further customized for the particular initiator port such as by adding and/or removing one or more target ports from the initiator port's current whitelist. Thus, each initiator port can have its own whitelist identifying the target ports that the particular initiator port can log into using PRLI to establish I-T connections of the defined persisted configuration. Assuming all target ports of the whitelist are zoned, logged into and registered with the SAN fabric, then all such target ports are discovered by the initiator port associated with the whitelist, where the initiator port can then subsequently log into all such target ports of the whitelist. Depending on the policy that may be applied and the I-T connections determined for the configuration, the initiator port may log into less than all target ports of its associated whitelist. Furthermore, if one or more of target ports of the initiator port's whitelist are offline and not logged into the fabric, then the initiator port is unable to log into such one or more target ports of the initiator port's whitelist. When the initiator port is reset and then restarts, for example, the initiator port can perform the steps 1-5 as described above (e.g., FIGS. 3 and 4) and then can selectively perform the step 6 to log into (e.g., using the PRLI command) only those target ports included in the initiator port's associated whitelist of target ports.

In at least one embodiment, there may be no logout command for an initiator port to logout of a target port for an established I-T connection. In such an embodiment, responsive to an update that removes a target port from the whitelist of an initiator port, the initiator port can be reset and then restarted to use its updated or modified white list. In at least one other embodiment, there may not be a logout command for an initiator port to logout of a target port for an established I-T connection. In this latter embodiment, responsive to an update that removes a target port from the whitelist of an initiator port, the initiator port can simply logout of the removed target port rather than reset the initiator port.

In at least one embodiment, responsive to adding a target port to the whitelist of an initiator port, the initiator port can use the PRLI command to login to the newly added target port.

In at least one embodiment with reference back to FIG. 5, the control path or management path of the initiator DS can perform the steps 502, 504, 506, 508 and 510; and the data path of the initiator DS can perform the steps 512, 514 and 516. In at least one embodiment, the FC driver can perform the processing of the first phase or part as described above and can also perform processing of the steps 514 and 516 of FIG. 5.

The flowcharts of FIGS. 6 and 7 discussed below provide further detail regarding processing that can be performed in an embodiment in accordance with the techniques of the present disclosure. In particular, FIG. 6 illustrates processing that can be performed in connection with resetting and restarting and initiator port; and FIG. 7 illustrates processing that can be performed in response to a change or modification to the whitelisted target ports associated with a particular initiator port.

Figure 6:
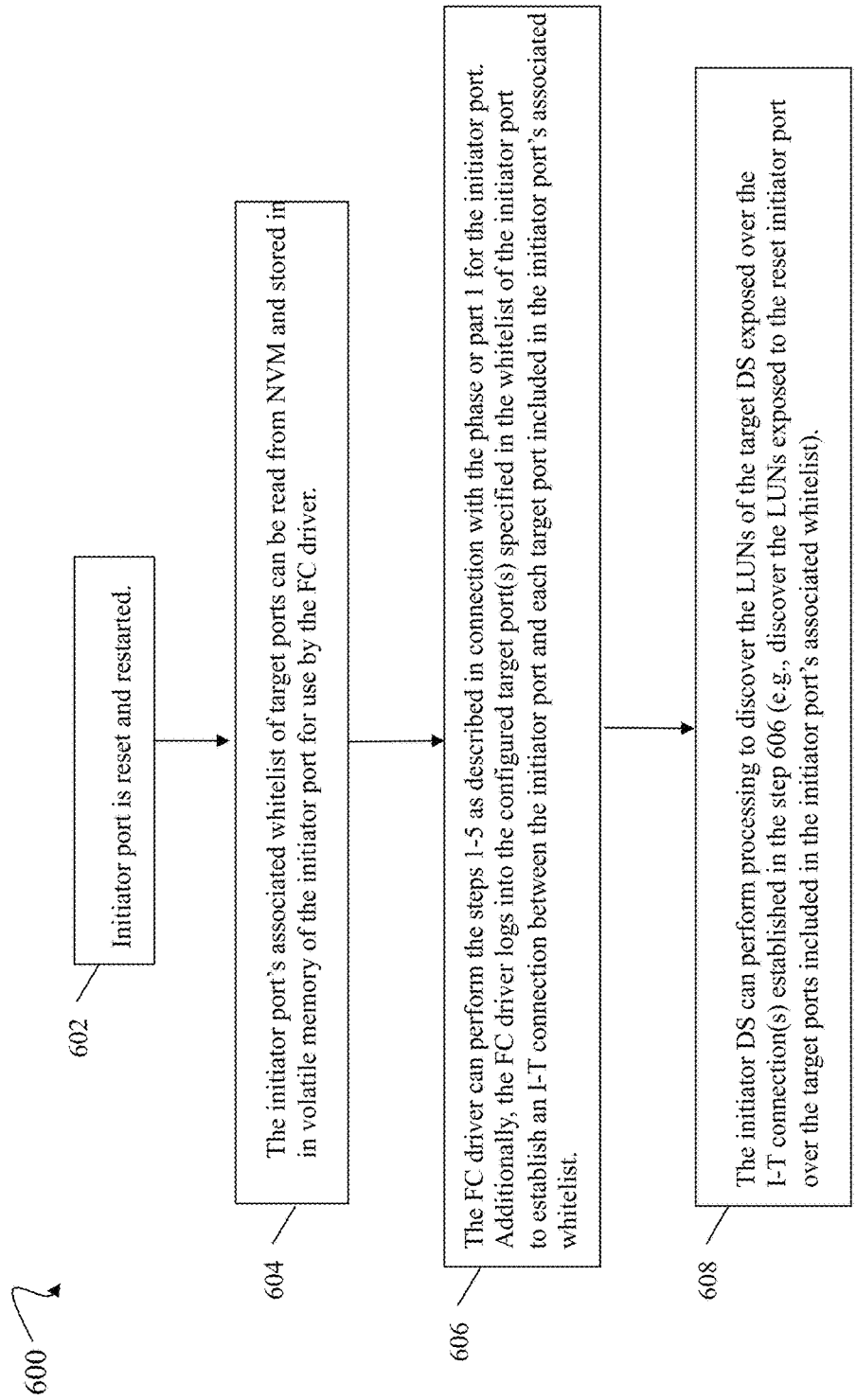
Figure 7:
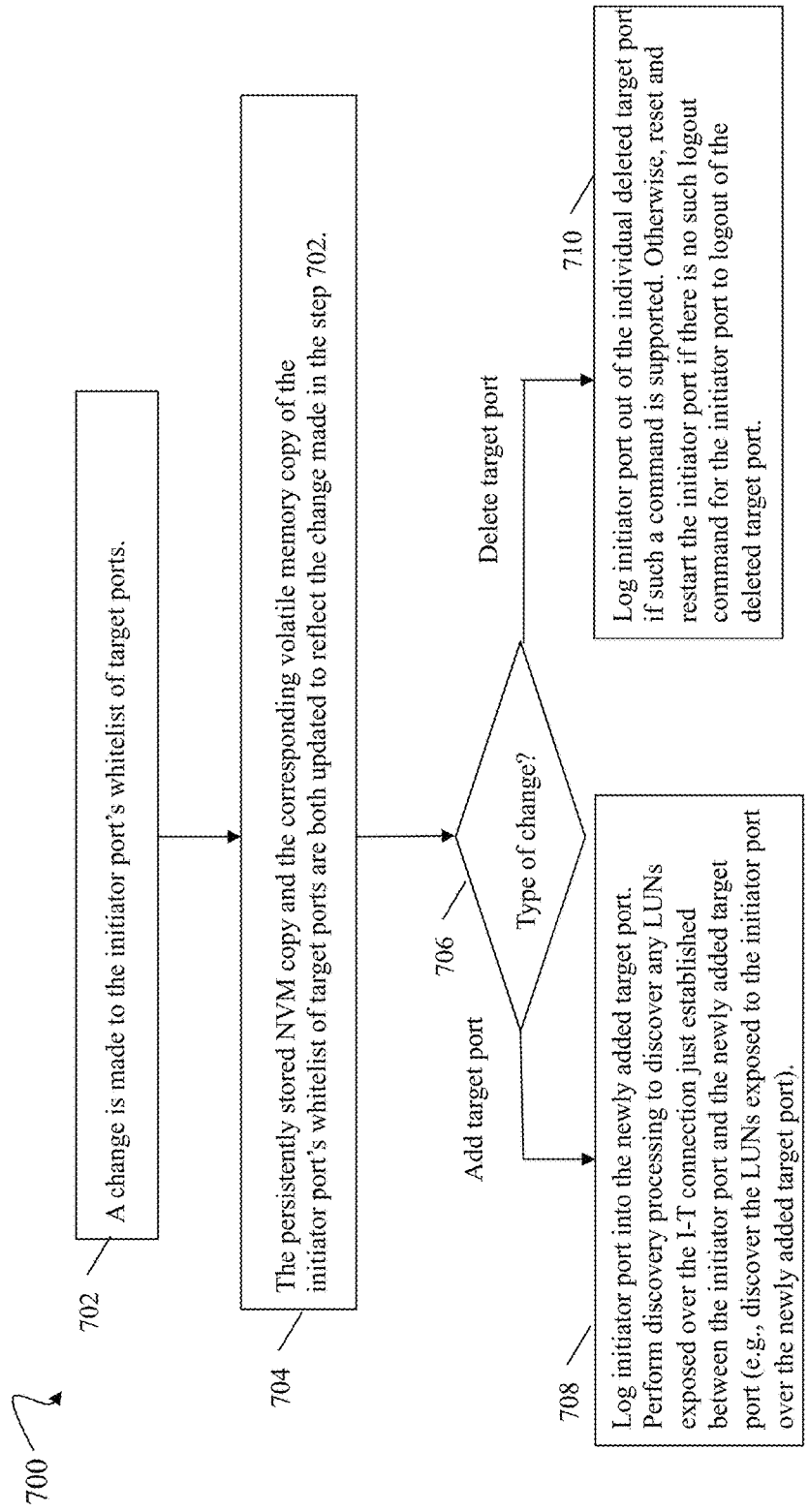

Referring to FIG. 6, the flowchart 600 includes a step 602. At the step 602, an initiator port is reset and restarted. From the step 602, processing proceeds to the step 604. At the step 604, the initiator port's associated whitelist of target ports can be read from NVM and stored in in volatile memory of the initiator port for use by the FC driver. The processing of the step 604 can be performed by the data path in at least one embodiment. From the step 604, control proceeds to the step 606.

At the step 606, the FC driver can perform the steps 1-5 as described in connection with the phase or part 1 for the initiator port. Additionally, the FC driver logs into the configured target port(s) specified in the whitelist of the initiator port to establish an I-T connection between the initiator port and each target port included in the initiator port's associated whitelist. From the step 606, control proceeds to the step 608.

At the step 608, the initiator DS can perform processing to discover the LUNs of the target DS exposed over the I-T connection(s) established in the step 606 (e.g., discover the LUNs exposed to the reset initiator port over the target ports included in the initiator port's associated whitelist).

Referring to FIG. 7, the flowchart 700 includes a step 702 where a change is made to the initiator port's whitelist of target ports. From the step 702, control proceeds to the step 704.

At the step 704, the persistently stored NVM copy and the corresponding volatile memory copy of the initiator port's whitelist of target ports are both updated to reflect the change made in the step 702. From the step 704, control proceeds to the step 706.

At the step 706, a determination is made regarding the type of change made to the initiator port's whitelist of target ports. In at least one embodiment, the change can be either adding a new target port to the whitelist, or otherwise deleting a target port from the whitelist. If the step 706 determines that the change deletes a target port, control proceeds to the step 710. At the step 710, processing can be performed, such as by the FC driver of the initiator port, to log the initiator port out of the individual deleted target port if such a command is supported. Otherwise, the initiator port can be reset and restarted if there is no such logout command for the initiator port to logout of the deleted target port. If the step 706 determines that the change adds a target port, control proceeds to the step 708. At the step 708, processing is performed, such as by the FC driver of the initiator port, to log the initiator port into the newly added target port. Subsequently, discovery processing can be performed to discover any LUNs exposed over the I-T connection just established between the initiator port and the newly added target port (e.g., discover the LUNs exposed to the initiator port over the newly added target port).

Figure 8:
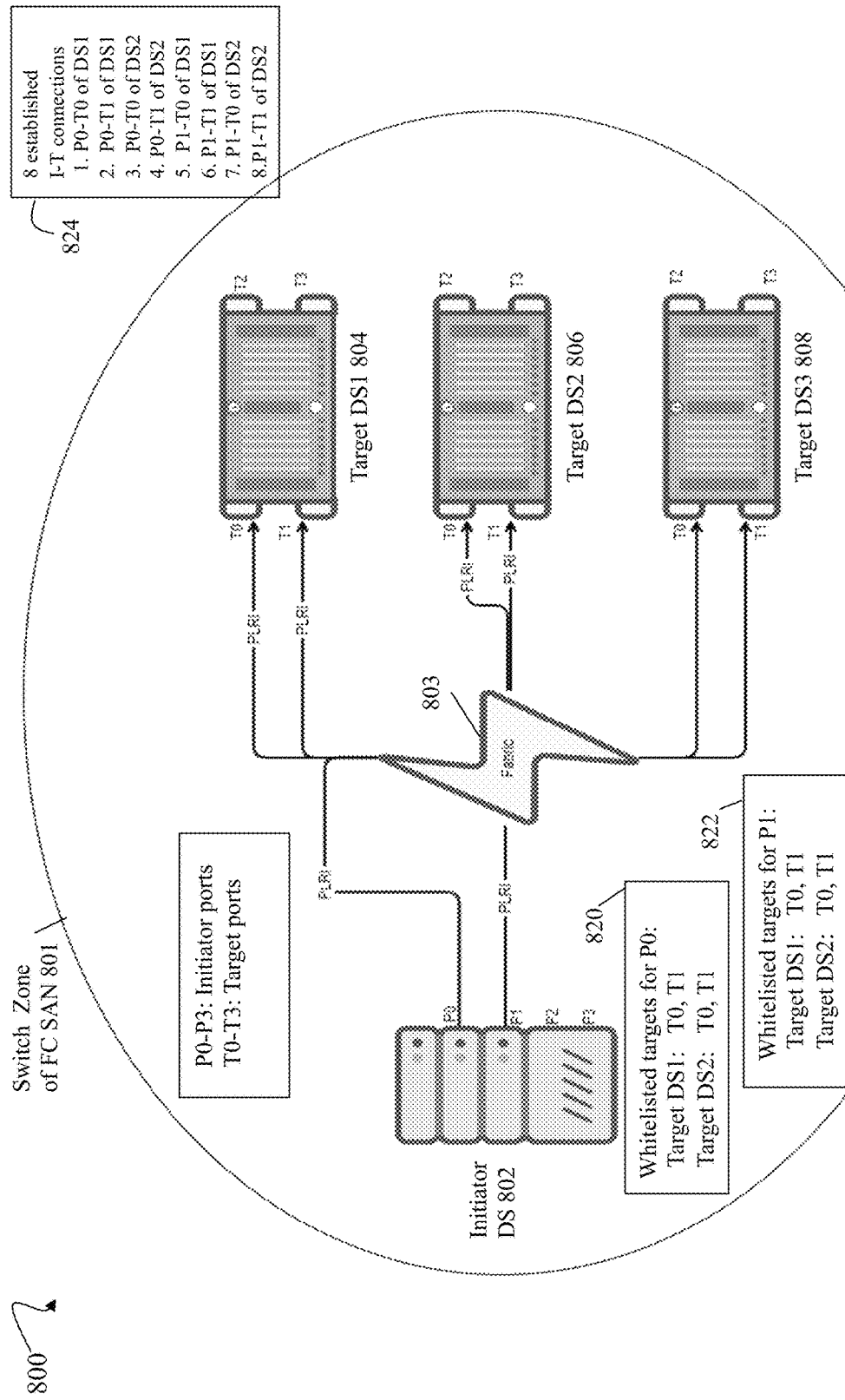
FIGS. 8 and 9 are examples illustrating components and connections in at least one embodiment in accordance with the techniques of the present disclosure.

Referring to FIG. 8, shown is an example illustrating use of the techniques of the present disclosure in at least one embodiment.

The example 800 illustrates a single switch zone 801 that includes a switch 803 (or more generally an FC fabric), an initiator DS 802 and 3 target DSs 804, 806 and 808. The initiator DS 802 includes the initiator ports P0-P3. Each of the targets DSs 804, 806 and 808 includes 4 target ports T0-T4. The element 820 denotes the whitelisted targets for the initiator port P0 and the element 822 denotes the whitelisted targets for the initiator port P1. The element 820 indicates the following target ports for the whitelist of the initiator port P0 of the initiator DS 802: the target ports T0 and T1 of the target DS1 804, and the target ports T0 and T1 of the target DS2 806. The element 822 indicates the following target ports for the whitelist of the initiator port P1 of the initiator DS 802: the target ports T0 and T1 of the target DS1 804, and the target ports T0 and T1 of the target DS2 806.

In accordance with the techniques of the present disclosure as a result of performing the first phase and the second phase of processing discussed above, the whitelisted targets 820 and 822 are used to establish I-T connections to only those target ports listed in the whitelists 820, 822. In this example, 8 I-T connections are established as a result, for example, of executing the processing of FIG. 5. As represented in the set of I-T connections 824, the 8 established connections are:

1. P0-T0 of DS1
2. P0-T1 of DS1
3. P0-T0 of DS2
4. P0-T1 of DS2
5. P1-T0 of DS1
6. P1-T1 of DS1
7. P1-T0 of DS2
8. P1-T1 of DS2

In FIG. 8, there are no established connections to any of the target ports of the target DS 3 808; there are no established connections to any of the target ports T2 and T3 of the systems 804 and 806; and there are no established connections from the initiator ports P2 and P3. More specifically, in FIG. 8, although the target ports T2 and T3 of the systems 804 and 806 can be zoned and visible to (e.g., discovered by) one or more of the initiator ports P0-P3 of the initiator DS 802, due to the whitelisted targets 820, 822 there are no established connections to any of the target ports T2 and T3 of the systems 804 and 806. Furthermore in FIG. 8, although the target ports of the system 808 can be zoned and visible to one or more of the initiator ports P0-P3 of the initiator DS 802, due to the whitelisted targets 820, 822 there are no established connections to any of the target ports T0-T3 of the target DS 3 808.

The above-noted 8 established I-T connections as illustrated in FIG. 8 are determined based on candidate I-T connections that are zoned and visible, and where the T's or targets of such connections are specified in the whitelists 820, 822.

Figure 9:
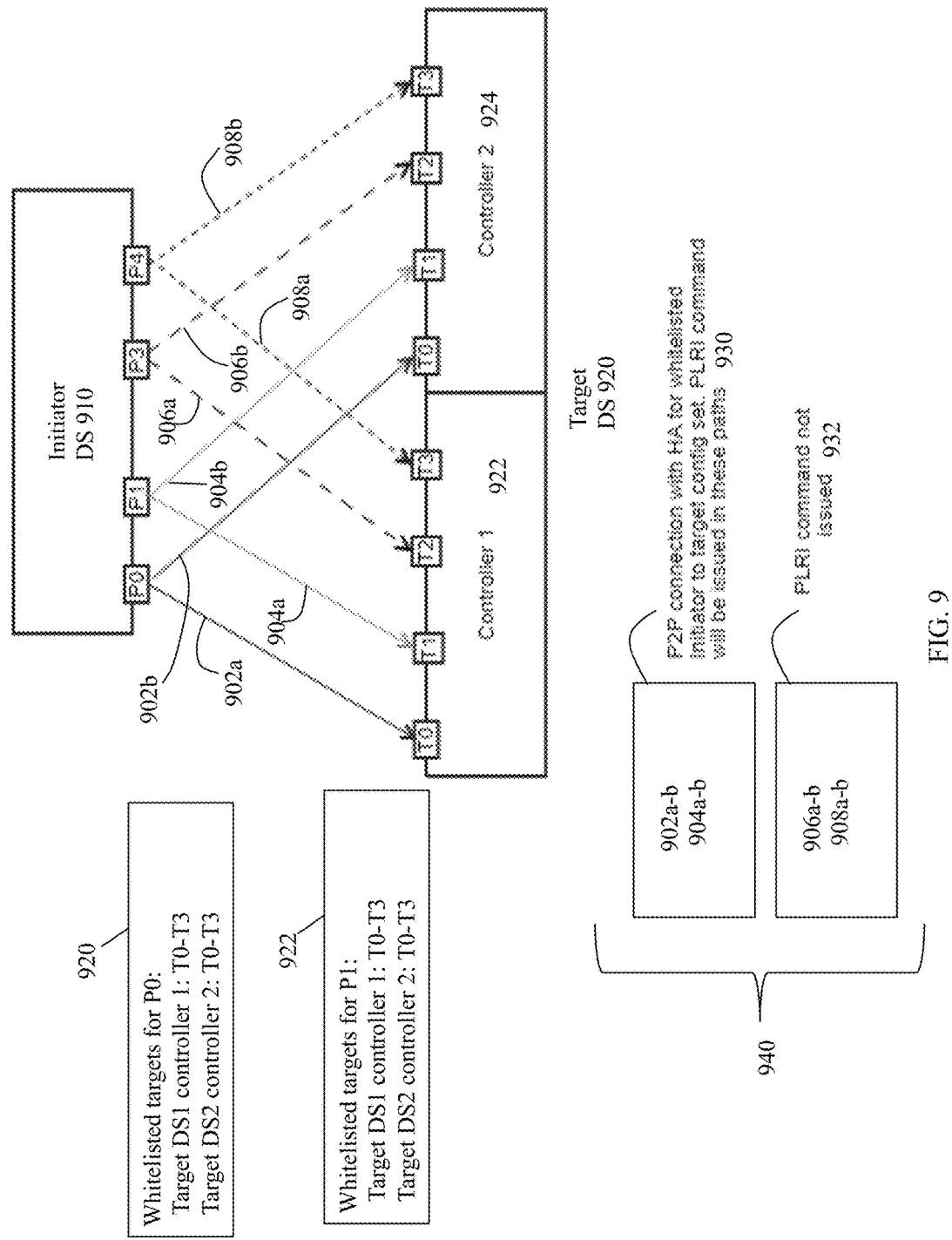

Referring to FIG. 9, shown is an example of an HA configuration in at least one embodiment in accordance with the present disclosure.

The example 900 includes an initiator DS 910 and a target DS 920. The initiator DS 910 includes the initiator ports P0-P3. The target DS 920 includes two controllers or nodes 922 and 924. The target DS 920 can be a dual node appliance, for example, as discussed in connection with FIG. 2. Each of the controllers or nodes 922 can include 4 target ports T0-T3.

In the example 900 for purposes of illustration, assume the initiator ports P0 and P1 are each zoned to all the target ports T0-T3 of the controller 922 and also zoned to all the target ports T0-T3 of the controller 924. Further in the example 900, the initiator port P0 discovers that all the target ports T0-T3 of the controller 922 are visible to the initiator port P0 and also discovers that all the target ports of the controller 924 are visible to the initiator port P0. Still further, the initiator port P1 discovers that all the target ports T0-T3 of the controller 922 are visible the initiator port P1, and also discovers all the target ports of the controller 924 are visible to the initiator port P1. Still further in the example 900, the initiator ports P3 and P4 may or may not be zoned to any of the target ports of the controllers 922 and 924.

In the example 900, the element 920 denotes the whitelisted targets for the initiator port P0 of the initiator DS 910, and the element 922 denotes the whitelisted targets for the initiator port P1 of the initiator DS 910. Assume in this example that there are no whitelisted targets for the initiator ports P2 and P3 of the initiator DS 910.

An HA policy as discussed above (e.g., in connection with FIG. 5 processing) can specify that each zoned and discovered initiator port be connected to two different target ports of the target DS 920. Further the HA policy can specify that each of the two different target ports be included in a different controller or node of the target DS 920. In this manner, each zoned and discovered initiator port is configured to have one connection to a target port in the controller 922 and a second connection to another target port in the controller 924 so that the initiator is able to communicate with the target DS 920 even if one of the controllers 922 or 924 fails.

In the example 900, the I-T connections or paths 902*a-b* and 904*a-b* are the established point to point (P2P) connections of the HA configuration for the whitelisted I-T configuration set. In particular, in the example 900, the whitelisted targets for the initiator port P0 are T0 and T1 of the controller 922; and T0 and T1 of the controller 924. Thus, the I-T connections or paths of the configuration are 902*a-b* and 904*a-b* as denoted by the element 930. The PRLI command is issued over the paths 902*a-b* and 904-*b* to establish the desired I-T connections over such paths. Also consistent with the foregoing whitelisted targets, the paths 906*a-b* and 908*a-b* are not established whereby the PRLI command is not issued over such paths as denoted by the element 932.

The example 900 of FIG. 9 illustrates one example of an HA configuration determined in accordance an HA policy with rules or requirements as discussed above. In the example 900, the whitelist of target ports for each of the initiator ports P0-P4 of the initiator DS 910 can be viewed as a further filter on top of zoned initiators and target so that the whitelists can be used to control or limit the zoned I-T connections. The zoned I-T connections can denote potential or candidate I-T connections of the HA configuration being created or defined. Further, the zoned I-T connection candidates considered at a point in time are limited to those at the point in time that are active, visible or discovered zoned I-T connections of the fabric (e.g., where each such I and T of the connections are logged into and registered with the fabric, and where each I of an I-T connection discovers the T of the connection over the fabric). The zoned candidate I-T connections that are active, visible or discovered are then further filtered using the white list of target ports specified for each of the initiator ports P0-P4 of the initiator DS 910. In the example 900, it may be that the initiator ports P3-P4 are zoned to one or more of the target ports of the target DS 920. However, there are no whitelisted targets in the target DS 920 for the initiator ports P3-P4 of the initiator DS 910. As an alternative, it may be that the initiator ports P3-P4 are not zoned for any of the target ports of the target DS 920, whereby the list of zoned I-T connections that are candidates for the HA configuration do not include any candidate connections from the initiator ports P3-P4 of the initiator DS 910.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   receiving a plurality of lists of target ports for a plurality of initiator ports, wherein each of the plurality of lists is associated with a corresponding one of the plurality of initiator ports and specifies one or more target ports for said corresponding initiator port, wherein an initiator system of a network fabric includes the plurality of initiator ports and wherein a target system of the network fabric includes a plurality of target ports;
   determining a configuration of a plurality of connections, wherein each of the plurality of connections is between one of the plurality of initiator ports and a target port included in a corresponding one of the plurality of lists associated with said one initiator port, and wherein the plurality of connections only includes connections to target ports included in the plurality of lists of target ports;
   establishing the plurality of connections, wherein said establishing the plurality of connections further comprises each of the plurality of initiator ports logging into each of the plurality of target ports that is visible to said each initiator port and included in a corresponding one of the plurality of lists associated with said each initiator port;
   zoning a switch of the network fabric to define a zone including the plurality of initiator ports, the plurality of target ports, and a plurality of zoned connections between the plurality of initiator ports and the plurality of target ports, wherein the zone includes a first target port which is not included in the plurality of target ports and which is also not included on any of the plurality of lists of target ports;
   subsequent to said zoning, performing first processing, wherein said first processing includes each of the plurality of initiator ports logging into the switch, each of the plurality of initiator ports registering with a name service of the fabric, and each of the plurality of target ports logging into the switch, and each of the plurality of target ports registering with the name service; and
   subsequent to said first processing, performing second processing, wherein said second processing includes each of the plurality of initiator ports discovering using the name service which of the plurality of target ports are visible over the switch to said each initiator port.

2. The computer-implemented method of claim 1, wherein each of the plurality of target ports that is visible to said each initiator port means that said each target port is logged into the switch, that said each initiator port is logged into the switch, that said each initiator port and said each target port are included in the zone, that said each initiator port is registered with the name service, and that said each target port is registered with the name service.

3. The computer-implemented method of claim 2, wherein the plurality of connections does not include any connection to the first target port.

4. The computer-implemented method of claim 3, further comprising:
   creating the plurality of lists of target ports.

5. The computer-implemented method of claim 4, wherein said creating the plurality of lists of target ports further comprises:
   determining a first list of target ports of the target system, wherein the first list identifies all target ports of the target system, wherein each target port of the first list is a candidate target port for use with each of the plurality of initiator ports;
   determining a second list of target ports of the target system, wherein the second list includes, for each of the plurality of initiator ports, each of the plurality of target ports which is zoned and visible to said each initiator port; and
   determining the plurality of lists of target ports in accordance with an overlap or intersection between the first list and the second list.

6. The computer-implemented method of claim 5, wherein said determining the first list of target ports is determined using an established control path connection between the initiator system and the target system.

7. The computer-implemented method of claim 6, wherein the initiator system is an initiator data storage system, and the target system is a target data storage system which is different than the initiator data storage system.

8. The computer-implemented method of claim 7, wherein said determining the first list of target ports further includes:
   querying, over the established control path connection, a database of the target data storage system for the first list of target ports of the target data storage system, wherein the database is a data storage system configuration database that describes physical entities and logical entities in a current configuration of the target data storage system.

9. The computer-implemented method of claim 8, wherein said determining the second list of target ports includes:
   querying the name service of the network fabric to determine, for each of the plurality of initiator ports, which of the plurality of target ports are visible to said each initiator port.

10. The computer-implemented method of claim 4, further comprising:
    modifying one of the plurality of lists of target ports, wherein the one list specifies target ports to which a first initiator port of the plurality of initiator ports is allowed to log into over the switch.

11. The computer-implemented method of claim 10, wherein said modifying includes adding a new target port to said one list.

12. The computer-implemented method of claim 11, wherein responsive to said adding the new target port to said one list, the computer-implemented method further comprises:
  logging the new target into the switch;
  registering the new target with the name service;
  discovering, by the first initiator port using the name service, that the new target port is visible to said first initiator port; and
  logging the first initiator port into said new target port.

13. The computer-implemented method of claim 10, wherein said modifying includes deleting an existing target port from said one list.

14. The computer-implemented method of claim 13, further comprising:
  responsive to said deleting the existing target port from said one list, logging said first initiator port out of said existing target port.

15. The computer-implemented method of claim 13, further comprising:
  responsive to said deleting the existing target port from said one list, resetting and restarting the first initiator port; and
  responsive to said resetting and restarting, performing processing including:
    logging the first initiator port into the switch;
    registering the first initiator port with the name service;
    discovering, using the name service, which of the plurality of target ports are visible to the first initiator port; and
    establishing connections between the first initiator port and each target port of the plurality of target ports which is included in said one list and also determined as visible to sad initiator port as a result of said discovering using the name service, which of the plurality of target ports are visible to the first initiator port.

16. A system comprising:
  one or more processors; and
  a non-transitory memory comprising code stored thereon that, when executed by at least a first of the one or more processors, performs a method comprising:
    receiving a plurality of lists of target ports for a plurality of initiator ports, wherein each of the plurality of lists is associated with a corresponding one of the plurality of initiator ports and specifies one or more target ports for said corresponding initiator port, wherein an initiator system of a network fabric includes the plurality of initiator ports and wherein a target system of the network fabric includes a plurality of target ports;
    determining a configuration of a plurality of connections, wherein each of the plurality of connections is between one of the plurality of initiator ports and a target port included in a corresponding one of the plurality of lists associated with said one initiator port, and wherein the plurality of connections only includes connections to target ports included in the plurality of lists of target ports;
    establishing the plurality of connections, wherein said establishing the plurality of connections further comprises each of the plurality of initiator ports logging into each of the plurality of target ports that is visible to said each initiator port and included in a corresponding one of the plurality of lists associated with said each initiator port;
    zoning a switch of the network fabric to define a zone including the plurality of initiator ports, the plurality of target ports, and a plurality of zoned connections between the plurality of initiator ports and the plurality of target ports, wherein the zone includes a first target port which is not included in the plurality of target ports and which is also not included on any of the plurality of lists of target ports;
    subsequent to said zoning, performing first processing, wherein said first processing includes each of the plurality of initiator ports logging into the switch, each of the plurality of initiator ports registering with a name service of the fabric, and each of the plurality of target ports logging into the switch, and each of the plurality of target ports registering with the name service; and
    subsequent to said first processing, performing second processing, wherein said second processing includes each of the plurality of initiator ports discovering using the name service which of the plurality of target ports are visible over the switch to said each initiator port.

17. A non-transitory computer readable medium comprising code stored thereon that, when executed by a processor, performs a method comprising:
  receiving a plurality of lists of target ports for a plurality of initiator ports, wherein each of the plurality of lists is associated with a corresponding one of the plurality of initiator ports and specifies one or more target ports for said corresponding initiator port, wherein an initiator system of a network fabric includes the plurality of initiator ports and wherein a target system of the network fabric includes a plurality of target ports;
  determining a configuration of a plurality of connections, wherein each of the plurality of connections is between one of the plurality of initiator ports and a target port included in a corresponding one of the plurality of lists associated with said one initiator port, and wherein the plurality of connections only includes connections to target ports included in the plurality of lists of target ports;
  establishing the plurality of connections, wherein said establishing the plurality of connections further comprises each of the plurality of initiator ports logging into each of the plurality of target ports that is visible to said each initiator port and included in a corresponding one of the plurality of lists associated with said each initiator port;
  zoning a switch of the network fabric to define a zone including the plurality of initiator ports, the plurality of target ports, and a plurality of zoned connections between the plurality of initiator ports and the plurality of target ports, wherein the zone includes a first target port which is not included in the plurality of target ports and which is also not included on any of the plurality of lists of target ports;
  subsequent to said zoning, performing first processing, wherein said first processing includes each of the plurality of initiator ports logging into the switch, each of the plurality of initiator ports registering with a name service of the fabric, and each of the plurality of target ports logging into the switch, and each of the plurality of target ports registering with the name service; and
  subsequent to said first processing, performing second processing, wherein said second processing includes each of the plurality of initiator ports discovering using the name service which of the plurality of target ports are visible over the switch to said each initiator port.

\* \* \* \* \*